United States Patent
McLoughlin et al.

(10) Patent No.: US 8,949,312 B2
(45) Date of Patent: Feb. 3, 2015

(54) UPDATING CLIENTS FROM A SERVER

(75) Inventors: Mark McLoughlin, Cork (GB);
William Nottingham, Raleigh, NC (US); Timothy Burke, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1439 days.

(21) Appl. No.: 11/439,955

(22) Filed: May 25, 2006

(65) Prior Publication Data
US 2007/0276916 A1 Nov. 29, 2007

(51) Int. Cl.
*G06F 15/16* (2006.01)
*G06F 9/44* (2006.01)
*G06F 9/445* (2006.01)

(52) U.S. Cl.
CPC ... *G06F 8/68* (2013.01); *G06F 8/63* (2013.01)
USPC ............ 709/203; 711/4; 711/133; 711/142; 711/143; 711/155; 709/219; 709/216; 709/215; 709/214; 709/213; 709/212; 714/763; 714/769; 714/770

(58) Field of Classification Search
USPC ............ 711/133, 120, 4, 155, 142, 143; 709/219, 203, 212, 213, 214, 215, 216; 714/769, 770, 763
See application file for complete search history.

(56) References Cited

U.S. PATENT DOCUMENTS

| | | | | |
|---|---|---|---|---|
| 5,001,628 A | * | 3/1991 | Johnson et al. | 707/10 |
| 5,493,728 A | * | 2/1996 | Solton et al. | 711/113 |
| 5,737,536 A | * | 4/1998 | Herrmann et al. | 709/229 |
| 5,805,846 A | * | 9/1998 | Nakajima et al. | 715/753 |
| 5,999,934 A | * | 12/1999 | Cohen et al. | 707/696 |
| 6,023,586 A | * | 2/2000 | Gaisford et al. | 717/178 |
| 6,311,206 B1 | * | 10/2001 | Malkin et al. | 709/202 |
| 6,317,668 B1 | * | 11/2001 | Thibault | 701/29.6 |
| 6,542,962 B2 | * | 4/2003 | Kodama et al. | 711/114 |
| 6,553,404 B2 | * | 4/2003 | Stern | 709/203 |
| 6,687,878 B1 | * | 2/2004 | Eintracht et al. | 715/201 |
| 6,694,406 B2 | * | 2/2004 | Kodama et al. | 711/114 |
| 6,839,744 B1 | * | 1/2005 | Kloba et al. | 709/219 |
| 6,847,984 B1 | * | 1/2005 | Midgley et al. | 1/1 |
| 6,868,417 B2 | * | 3/2005 | Kazar et al. | 1/1 |
| 6,892,221 B2 | * | 5/2005 | Ricart et al. | 709/203 |
| 6,947,063 B1 | * | 9/2005 | Cirulli et al. | 715/851 |
| 6,959,310 B2 | * | 10/2005 | Eshel et al. | 1/1 |
| 6,966,059 B1 | * | 11/2005 | Shetty et al. | 717/172 |
| 7,103,713 B2 | * | 9/2006 | Saika et al. | 711/112 |
| 7,188,157 B1 | * | 3/2007 | Kodama et al. | 709/220 |
| 7,246,211 B1 | * | 7/2007 | Beloussov et al. | 711/162 |
| 7,287,133 B2 | * | 10/2007 | Rowan et al. | 711/156 |
| 7,308,528 B2 | * | 12/2007 | Kitamura et al. | 711/111 |
| 7,434,264 B2 | * | 10/2008 | Moyer et al. | 726/28 |
| 7,596,713 B2 | * | 9/2009 | Mani-Meitav et al. | 714/6.32 |
| 7,636,814 B1 | * | 12/2009 | Karr et al. | 711/143 |
| 8,132,060 B2 | * | 3/2012 | Worner et al. | 714/57 |

(Continued)

FOREIGN PATENT DOCUMENTS

TW 503368 * 9/2002

*Primary Examiner* — Tamara T Kyle
*Assistant Examiner* — Anthony Fabbri
(74) *Attorney, Agent, or Firm* — Lowenstein Sandler LLP

(57) ABSTRACT

An embodiment generally relates to a method of updating clients from a server. The method includes maintaining a master copy of a software on a server and capturing changes to the master copy of the software on an update disk image, where the changes are contained in at least one chunk. The method also includes merging the update disk image with one of two client disk images of the client copy of the software.

18 Claims, 7 Drawing Sheets

(56) References Cited

U.S. PATENT DOCUMENTS

| | | | |
|---|---|---|---|
| 8,255,637 B2* | 8/2012 | Yochai | 711/141 |
| 8,306,950 B2* | 11/2012 | Adkins et al. | 707/639 |
| 8,447,943 B2* | 5/2013 | Kawaguchi | 711/163 |
| 8,495,304 B1* | 7/2013 | Natanzon et al. | 711/133 |
| 8,572,337 B1* | 10/2013 | Gokhale et al. | 711/162 |
| 2001/0042073 A1* | 11/2001 | Saether et al. | 707/203 |
| 2002/0111991 A1* | 8/2002 | Wood et al. | 709/203 |
| 2002/0112113 A1* | 8/2002 | Karpoff et al. | 711/4 |
| 2003/0028819 A1* | 2/2003 | Chiu et al. | 714/5 |
| 2003/0061456 A1* | 3/2003 | Ofek et al. | 711/162 |
| 2003/0066065 A1* | 4/2003 | Larkin | 717/177 |
| 2003/0115295 A1* | 6/2003 | Potts et al. | 709/219 |
| 2003/0159007 A1* | 8/2003 | Sawdon et al. | 711/154 |
| 2003/0187883 A1* | 10/2003 | Zelenka et al. | 707/201 |
| 2004/0186900 A1* | 9/2004 | Nakano et al. | 709/213 |
| 2005/0071436 A1* | 3/2005 | Hsu et al. | 709/212 |
| 2005/0125593 A1* | 6/2005 | Karpoff et al. | 711/4 |
| 2005/0137757 A1* | 6/2005 | Phelan et al. | 701/1 |
| 2005/0159890 A1* | 7/2005 | Humphries et al. | 701/213 |
| 2005/0182538 A1* | 8/2005 | Phelan et al. | 701/35 |
| 2005/0216535 A1* | 9/2005 | Saika et al. | 707/204 |
| 2006/0053139 A1* | 3/2006 | Marzinski et al. | 707/101 |
| 2006/0080385 A1* | 4/2006 | Blandford et al. | 709/203 |
| 2006/0101215 A1* | 5/2006 | Yuasa | 711/162 |
| 2006/0136685 A1* | 6/2006 | Griv et al. | 711/162 |
| 2006/0179250 A1* | 8/2006 | Guthrie et al. | 711/143 |
| 2009/0287890 A1* | 11/2009 | Bolosky | 711/155 |
| 2010/0036931 A1* | 2/2010 | Certain et al. | 709/214 |
| 2011/0072069 A1* | 3/2011 | Pirzada et al. | 709/203 |

* cited by examiner

UPDATING CLIENTS FROM A SERVER

FIELD

This invention generally relates to client-server systems. More particularly, the invention relates to a method and system for updating clients from a server.

DESCRIPTION OF THE RELATED ART

Large entities such as businesses and educational institutions often connect user computer stations with a network which is in turn connected to a local server. This allows users of the computer stations to share files, programs, software, and the like. Under this arrangement, a network administrator may centrally install and manage software applications on the server to allow each station that is connected to the server to access the software application from the server. This arrangement relieves the network administrator of having to download the new software application onto each individual computer. The stations running the software application remotely from the server are referred to as clients. Clients may store copies of the software applications locally to improve the performance for the user.

When managing distributed client environments, system administrators are often required to centrally manage software deployment. For example, a software application is generally updated directly on the server, typically by installing the new version upgrade from a CD-ROM or by download from a specific location on the Internet or other network. Portions of the application that reside on the client can be downloaded from the server or otherwise installed while the application is not in use.

Keeping the versions of the application straight in these distributed environments can also be quite troublesome. As is often the case, when a new version of software is developed, the system administrator must distribute the new version or otherwise verify that each client on the same network has the new version.

The downtime that is involved with installing new versions of software onto remote clients can create problems. For example, once installation of the new software is completed, the application may need to be restarted on the client and possibly even the entire workstation may have to be restarted before the new version of the software application is accessible. When a new version of a software application is pushed upon the client while the software application is executing, the user is likely to temporarily or permanently lose data. Even when users are alerted and save their data, work is interrupted, and after the installation of the software application update, the user is generally required to restart the application, and in some cases the entire machine. The user is thus left waiting while the machine reboots, the application restarts, the installation process is completed, and the document is found again and reopened.

Providing the client with the new version of a software application is also burdensome on system administrators. For example, when a new or updated version of an application is available for download from the Internet, the system administrator is typically required to verify that each client is aware of the updated version of the application and to verify that the updated version is properly installed on each client.

SUMMARY

An embodiment generally relates to a method of updating clients from a server. The method includes maintaining a master copy of a software on a server and capturing changes to the master copy of the software on an update disk image, where the changes are contained in at least one chunk. The method also includes merging the update disk image with one of two client disk images of the client copy of the software.

Another embodiment pertains generally to a system for updating clients from a server. The system includes a network configured to provide a communication channel, a server configured to comprise of at least one processor, a memory, and at least one server disk. The at least one server disk is configured to store a master copy of a software. The server is also configured to maintain a server disk image of the master copy of the software. The system also includes a plurality of clients, where each client is implemented as a computing platform with at least one processor, memory, and at least one client disk. The client is configured to store and execute a client version of the software and interface with the network. The server is further configured to create and maintain an update disk image that is partitioned into chunks, aggregate changes to the server disk image of the master copy of the software, and transmit the update disk image to at least one client of the plurality of clients over the network. Each client is configured to merge the update disk image to update the client version of the software.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

Figure 1:
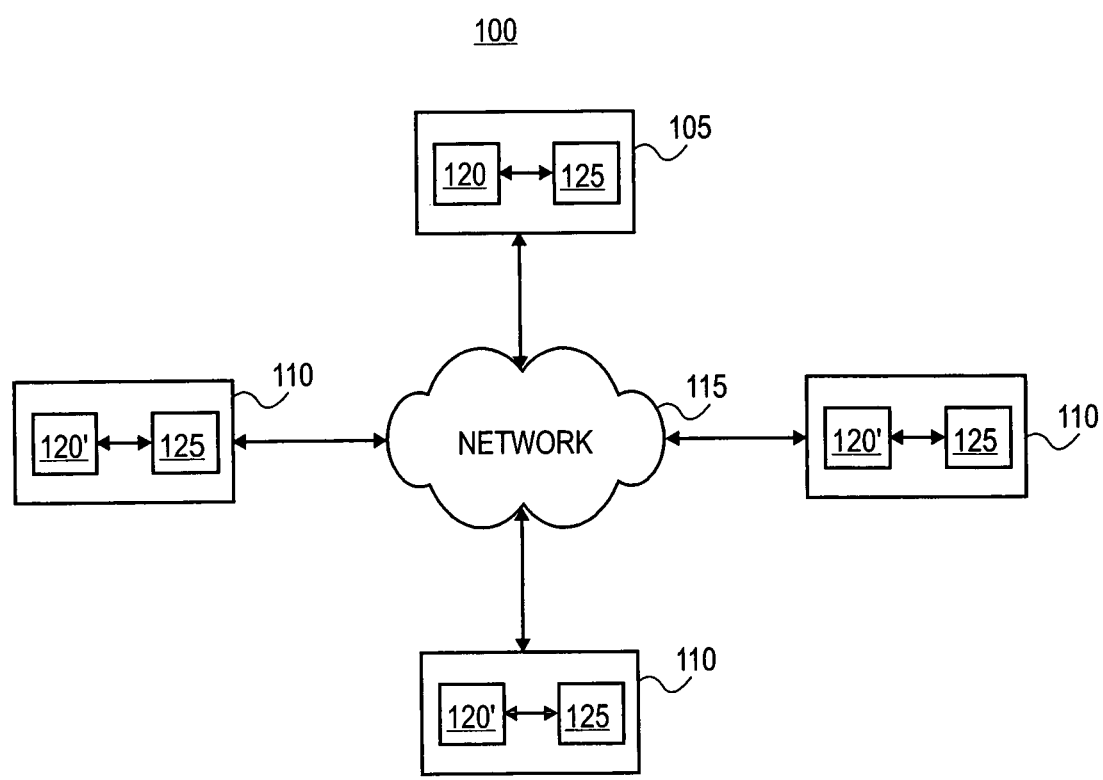
FIG. 1 illustrates an exemplary system 100 in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of distributed environments and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to methods and systems for updating software. More particularly, an image update process may be configured to aggregate modifications, changes, or updates to software based on copy-on-write ("COW") disk images and snapshots. A master copy of the software may be stored on an underlying file system that includes at least one disk drive. A logical volume manager (LVM) may generally be configured to manage the file system for a user. In a broad sense, the LVM may present a virtual single disk to the user although the physical data may be spread over multiple disks.

The LVM may include a snapshot feature which may create an image of the disk drive at a certain point in time. The LVM may then use snapshots to manage the file systems. For example, the LVM may create a disk image of the underlying physical disks so the server may provide services based on the disk image. The use of disk images may be preferable for multi-users system as a measure of protection, among other reasons, for the actual data stored on the physical disks. For example, one user may implement a change which may be captured by the disk image. The changes may crash the disk image but this crash would not affect the physical data.

The LVM may also create two more disk images of the server disk image: a snapshot origin logical view (snapshot origin fork) and a snapshot logical view (snapshot fork). Changes to the master software may be made to the underlying disk drive through either logical view. However, the LVM may be configured to manage the two logical views such that changes in the snapshot origin fork are not visible to the snapshot fork and vice-a-versa.

The LVM may also implement a copy-on-write (COW) feature. The LVM may create a COW disk image from the server disk image. The COW disk image may be partitioned into fixed size logical chunks (or blocks). The LVM may utilize the COW disk image to capture changes from the snapshot origin view and the snapshot logical view. More specifically, for changes implemented through the snapshot origin fork, the LVM may be configured to copy a chunk(s) affected by a change from the server disk image to the COW disk image and the change is made to the chunk in the server disk image. For changes implemented through the snapshot fork, the LVM may also be configured to copy chunk(s) affected by changes to the COW disk image and implement the change on the copied chunk on the COW disk image.

Accordingly, various embodiments may use the snapshot origin fork, snapshot fork and the COW disk image to update software in a client-server system. More specifically, an image update process executing on a server may be configured to create a server snapshot origin fork, a server snapshot fork, and a server COW disk image from an original server disk image of the disk(s) that store the client copy of the server software. One example of software may be an operating system such as Linux™, Solaris™, etc. Any modifications, changes, updates to the software may be implemented through the server snapshot fork. The chunks that are affected by the changes are copied from the original server disk image to the COW disk image and those changes are implemented to the COW disk image. Accordingly, the changes to the master copy of the software may be captured in the COW disk image without disrupting the original disk image. The image update process may be further configured to accumulate the changes to the master copy of the software on the COW disk image. A limit to the aggregation of the changes may be based on time, number of changes or other user-specified reasons.

In other embodiments, when the clients of the server boot, a LVM of the clients may be configured to create logical views of the underlying disk storing the cached copy of the software. More particularly, the client may have the disk image of the cached copy of the software with client snapshot logical view (client snapshot fork), a client snapshot logical view (client snapshot client fork), and a client COW disk image to maintain the forked disk images, i.e., the logical views.

The client may also be configured to execute a client update image process that may be configured to contact the server and ask for an update for the software. The server may be configured to transmit the update in the form of the server COW disk image. The server COW disk image may contain an aggregate of changes implemented at the server since the last update or the aggregate of changes from the current version of the client software and the latest version of the software on the server.

When the client image update process receives the update in the form of COW disk image from the server, the client image update process may create a second snapshot based on the client snapshot origin and the received server COW image. Since the received server COW image contains all the changes between the client copy of the software and the server copy of the software and the client snapshot origin contains the current copy of the client software, the second snapshot may contain the server copy of the software as an amalgamation of the received server COW image and the client snapshot origin, i.e., the latest version of the software. The client image update process may then be configured to merge the second snapshot, which contains the current version of the server software, with the client snapshot origin. More specifically, the client image update process may be configured to copy the modified chunks from the server COW disk image to the client snapshot origin. For changes to the snapshot origin, chunks affected by the change are copied from the client disk image to the client COW disk image and the change is made to the chunk in the client disk image. Accordingly, when the merger is complete, the snapshot and the client snapshot origin are identical and the snapshot may be discarded. The client disk image has been updated to the current version of the software on the server. Subsequently, when client boots, the LVM of the clients may create the snapshots and COW disk image based on the newly updated disk image.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a server 105, clients 110 and a network 115. The server 105 may be a computing platform configured to execute a multiple user operating system 120 and associated applications (not shown). The server 105 may be implemented with server platforms as known to those skilled in the art from Intel, Advanced Micro Devices, Hewlett-Packard, etc.

Figure 2A:
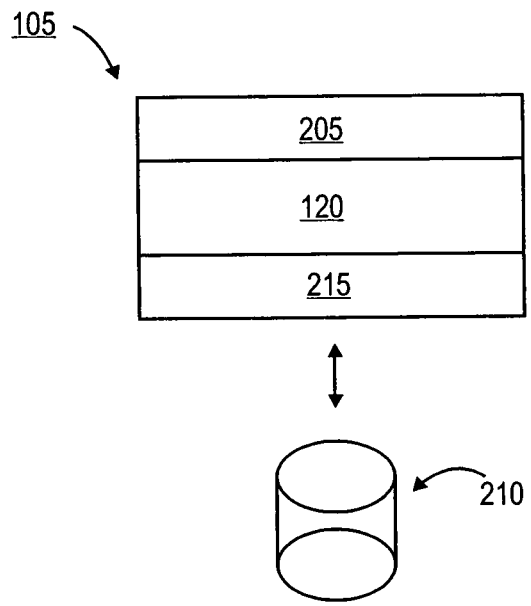
FIG. 2A illustrates an architectural diagram of the server in accordance with another embodiment.

FIG. 2 illustrates a more detailed view of the server 105. As shown in FIG. 2, the server 105 may execute the operating system 120. Associated applications 205 may execute through the operating system 120. The operating system 120 may also interface with at least one disk drive 210 through a logical volume manager (LVM) 215. The disk drive 210 may store master copies of the operating system (O/S) and the associated applications 205 such as word processing applications, numerical analysis applications, etc.

The LVM 215 may be configured to manage the disk drive 210 for the users. In a broad sense, the LVM 215 may present a virtual single disk to the user although the physical data may be spread over multiple disks. As part of the file management, the LVM 215 may use a snapshot which creates an image of the disk drive 210 at a certain point in time for file management. For example, the LVM 215 may create a disk image of the underlying physical disks so the server 105 may provide services based on the disk image. The use of disk images may be preferable for multi-users system as a measure of protection, among other reasons, for the actual data stored on the physical disks. For example, one user may implement a change which may be captured by the disk image. The changes may crash the disk image but this crash would not affect the physical data.

Figure 2B:
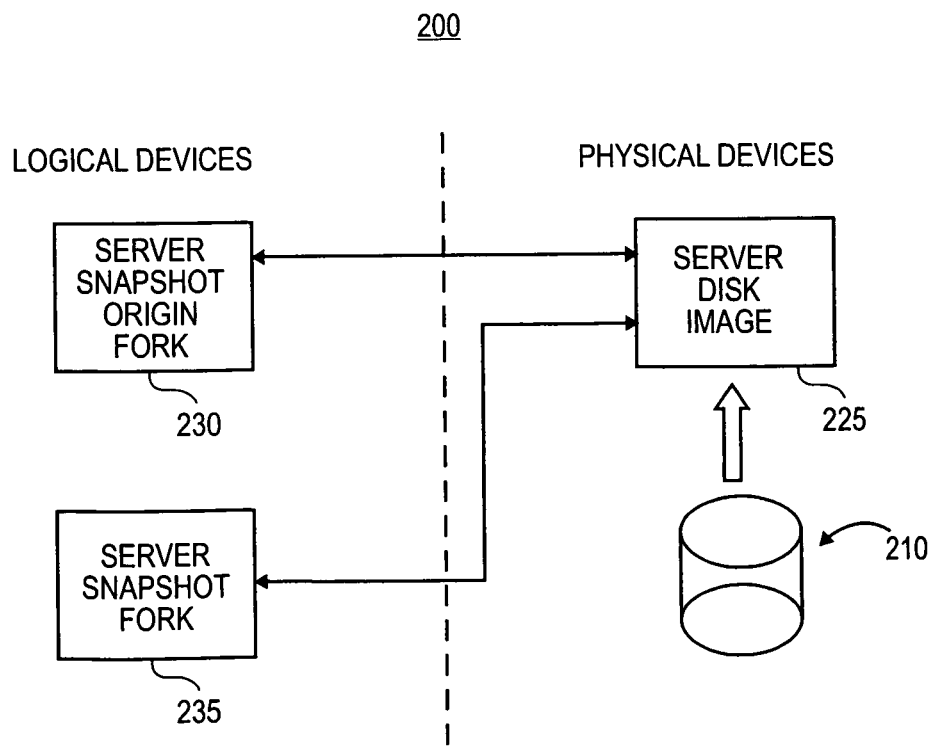
FIG. 2B illustrates a snapshot management by a server logical volume manager (LVM)

According to various embodiments, the LVM 215 may be further configured to create two disk images from a disk image of the disk 210, i.e., the server disk image, to manage changes to the master copy of software stored on the disk 210, as depicted in FIG. 2B. As shown in FIG. 2B, the LVM 215 may create a server disk image 225 using the snapshot feature during the boot sequence of the server. The LVM 215 may also use the snapshot feature to create two additional disk images from the server disk image 225: a server snapshot origin disk image (or server snapshot origin fork) 230 and a server snapshot disk image (or server snapshot fork) 235. Any changes to the master copy of the software stored on disk 205 may be implemented through either snapshot origin fork 230 or the snapshot fork 235. However, the LVM 215 may be configured to manage the two logical views such that changes on the server snapshot origin fork 230 are not visible to the server snapshot fork 235 and changes to the server snapshot fork 235 are not visible to the server snapshot origin fork 230.

Figure 3:
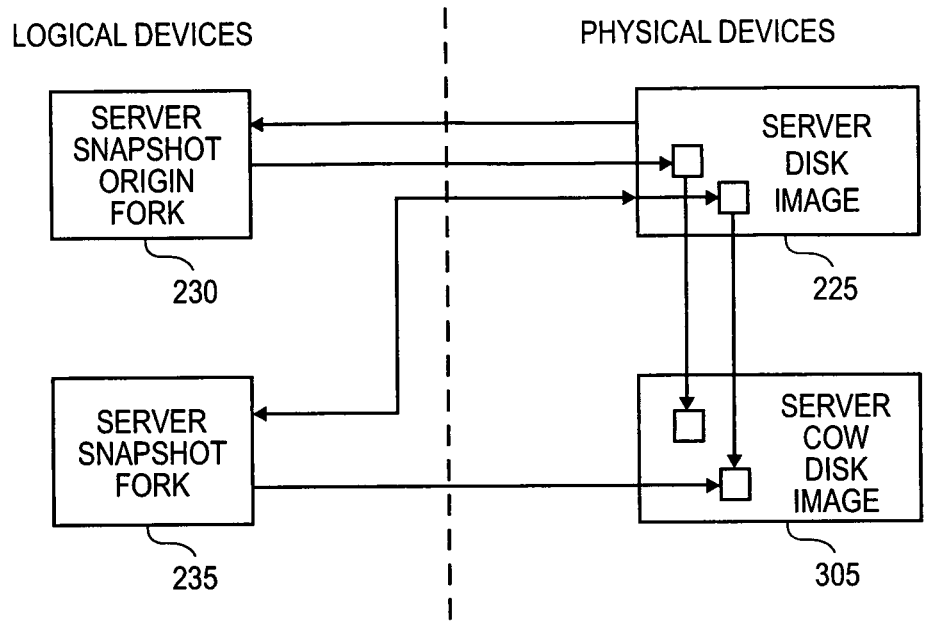
FIG. 3 illustrate exemplary server disk images in accordance with an embodiment.

Moreover, the LVM 215 may also be configured to implement a copy-on-write (COW) feature with the server snapshot origin fork 230 and the server snapshot fork 235, as depicted in FIG. 3. As shown in FIG. 3, the LVM 215 may create a server COW disk image 305 from the server disk image 225. Generally, copy-on-write is a memory allocation strategy where data is written only if it has it been modified. Thus, in various embodiments, the LVM 215 may partition the server COW disk image 305 into fixed size logical chunks (or blocks). The LVM 215 may utilize the server COW disk image 305 to capture changes from the server snapshot origin fork 230 and the server snapshot fork 235. More specifically, for changes implemented through the server snapshot origin fork 230, the LVM 215 may be configured to copy a chunk(s) affected by a change from the server disk image 225 to the server COW disk image 305 and the change is made to the chunk in the server disk image 225. For changes implemented through the server snapshot fork 235, the LVM 215 may also be configured to copy chunk(s) affected by changes to the server COW disk image 305 and implement the change on the copied chunk on the server COW disk image 305.

Returning to FIG. 1, the server 105 may also execute an image update process 125 configured to manage changes to the master copy of the software. More specifically, the image update process 125 may direct a user to implement changes to the master copy of the software through the server snapshot fork 235. More specifically, an image update process 125 executing on a server 105 may be configured to create a server snapshot origin fork 230, a server snapshot fork 235, and a server COW disk image 305 from the server disk image 225 of the disk(s) that store the client copy of the server software. One example of software may be an operating system such as Linux™, Solaris™, etc. Any modifications, changes, updates to the software may be implemented through the server snapshot fork 235. The chunks that are affected by the changes are copied from the server disk image 225 to the server COW disk image 305 and those changes are implemented to the server COW disk image 305. Accordingly, the changes to the master copy of the software may be captured in the server COW disk image 305 without disrupting the server disk image 225. The image update process may be further configured to accumulate the changes to the master copy of the software on the server COW disk image 305. A limit to the aggregation of the changes may be based on time, number of changes or other user-specified reasons.

Figure 4A:
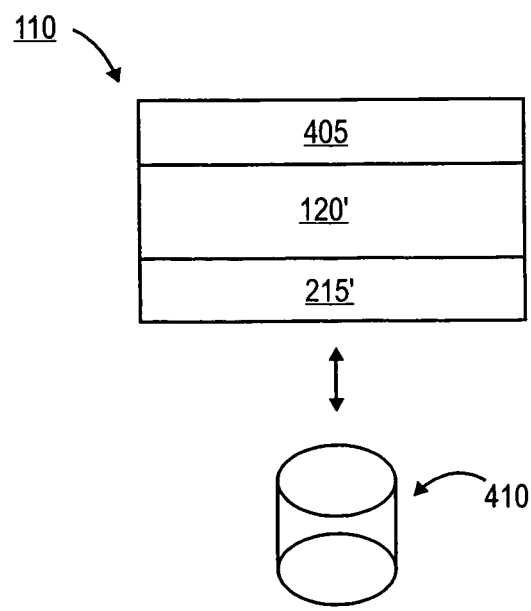
FIG. 4A illustrates an architectural diagram of a client in accordance with yet another embodiment.

The clients 110 may be a computing platform configured to connect and interface with the server 105. Similar to the server 105, a client 110 may execute a client version of the operating system 120', as depicted in FIG. 4A. As shown in FIG. 4A, associated applications 405 may execute through the operating system 120'. The operating system 120' may also interface with at least one disk drive 410 through a LVM 215'. The disk drive 410 may store the client copies of the operating system (O/S) 120' and the associated applications 405' such as word processing applications, numerical analysis applications, etc. The LVM 215' manages the disk drive 410 in a similar manner as the LVM 215 on the server 105 as previously described.

Figure 4B:
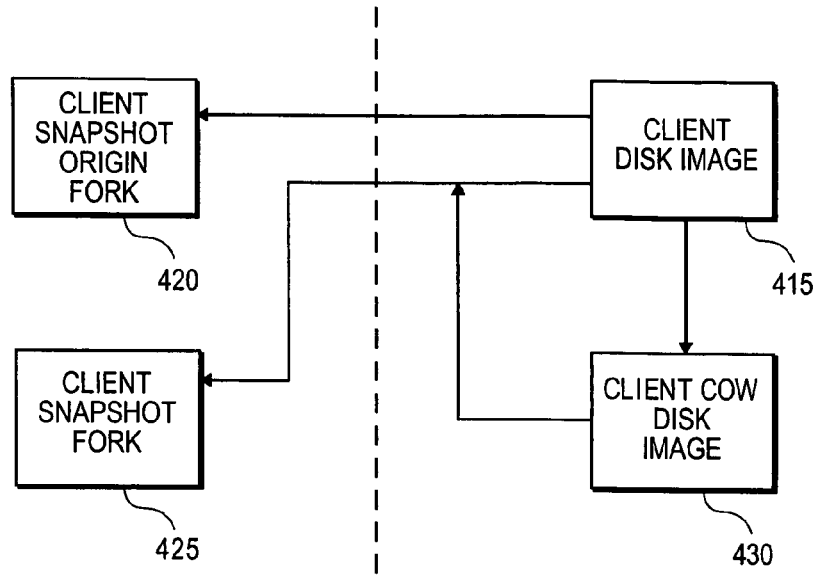
FIG. 4B illustrates another snapshot management by a client LVM.

In some embodiments, when the client 110 executes a boot sequence, the LVM 215' may be configured to create logical views of the underlying disk storing the client copy of the server software as depicted in FIG. 4B. As shown in FIG. 4B, the LVM 215' may create a client disk image 415 of the client copy (or version) of the server software with a client snapshot origin fork logical view (client snapshot origin fork) 420, a client snapshot logical view (client snapshot fork) 425, and a client COW disk image 430 to maintain the client snapshot origin fork 420 and the client snapshot fork 425. Similar to FIG. 3 on the server, for changes implemented through the client snapshot origin fork 420, the LVM 215' may be configured to copy a chunk(s) affected by a change from the client disk image 415 to the client COW disk image 430 and the change is made to the chunk in the client disk image 415. For changes implemented through the client snapshot fork 425, the LVM 215' may also be configured to copy chunk(s) affected by changes to the client COW disk image 430 and implement the change on the copied chunk on the client COW disk image 430.

Returning to FIG. 1, the client 110 may also be configured to execute a client update image process 125' that may be configured to contact the server and ask for an update for the software. The server 105 may be configured to transmit the update in the form of the server COW disk image 305. The server COW disk image 305 may contain an aggregate of changes implemented at the server 105 since the last update or the aggregate of changes from the current version of the client software and the latest version of the software on the server 105.

Figure 4C:
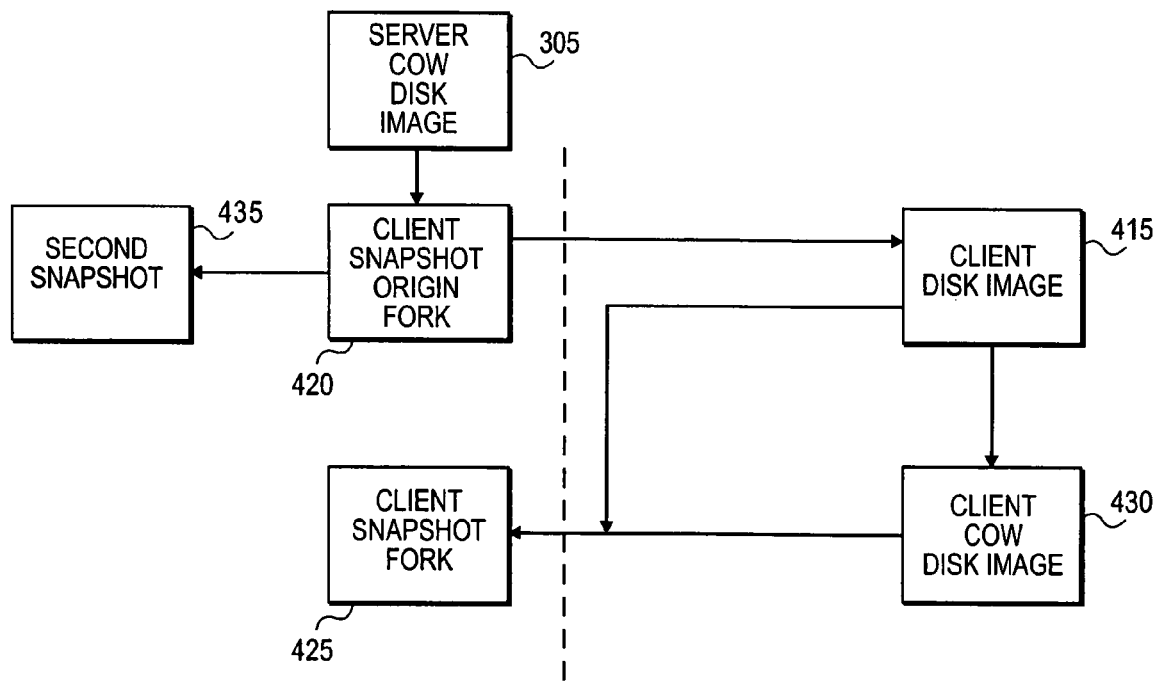
FIG. 4C illustrates yet another snapshot management diagram by the client LVM.

When the client image update process 125' receives the update in the form of server COW disk image from the server 105, the client image update process 125' may create a second snapshot based on the client snapshot origin and the received server COW disk image, as depicted in FIG. 4C. As shown in FIG. 4C, the received server COW disk image 305 contains all the changes between the client copy of the software and the server copy of the software and the client snapshot origin fork 420 contains the current copy of the client software, the second snapshot 435 may contain the server copy of the software as an amalgamation of the received server COW disk image 305 and the client snapshot origin fork 420, i.e., the latest version of the software. The client image update process 125' may then be configured to merge the second snapshot 435, which contains the current version of the server software, with the client snapshot origin fork 420. More specifically, the client image update process may be configured to copy the modified chunks from the server COW disk image 305 to the client snapshot origin fork 420. For changes to the client snapshot origin fork 420, chunks affected by the change are copied from the client disk image 415 to the client COW disk image 430 and the change is made to the chunk in the client disk image 415. Accordingly, when the merger is complete, the second snapshot 435 and the client snapshot origin fork 420 are identical and the second snapshot 435 may be discarded. The client disk image 415 has been updated to the current version of the software on the server 105. Subsequently, when client 110 boots, the LVM 125' of the client may create the snapshots and COW disk image based on the newly updated disk image.

Figure 5:
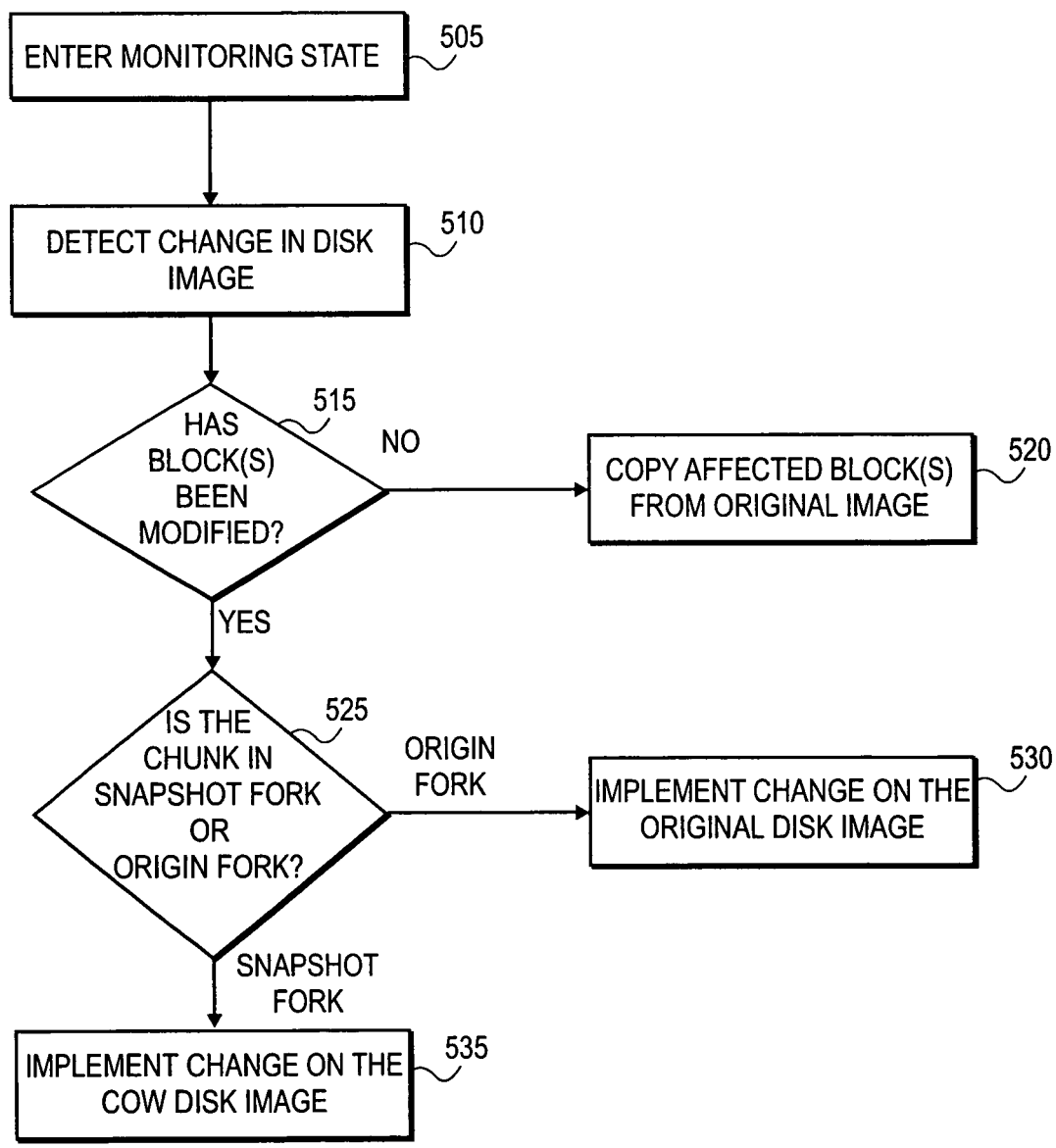
FIG. 5 illustrates an exemplary flow diagram in accordance with another embodiment.

FIG. 5 depicts a flow diagram 500 implemented by the update image process 125 of the server 105 in accordance with an embodiment. It should be readily obvious to one of ordinary skill in the art that existing steps may be modified and/or deleted and other steps added in FIG. 5.

As shown in FIG. 5, the image update process 125 may be invoked on the server 105 and configured to monitor for changes to the server snapshot fork 235, in step 505. More specifically, after instantiation, the image update process 125 may be configured to monitor the server snapshot fork 235 for any changes, modification or updates to the master copy of the server software. In some embodiments, the software may include operating system, utilities, applets, software applications (e.g., word processing, analysis programs, etc.).

In step 510, the image update process 125 may be configured to detect a change in the server snapshot fork 235. For example, a user may be attempting to write a new driver for the operating system 120. The image update process 125 may be configured to determine whether the blocks that are affected by the incoming change have been modified previously, in step 515.

If the affected blocks have not been modified, the image update process 125 may be configured to copy the affected blocks from the server disk image 225, in step 520. Subsequently, the image update process 125 may return to the monitoring state of step 505. Otherwise, if the affected blocks have been modified, the image update process 125 may be configured to determine whether the incoming change is being effectuated on either the server snapshot origin fork 230 or the server snapshot fork 235, in step 525.

If the changes are being implemented on the server snapshot origin fork 230, the image update process 125 may be configured to copy the affected blocks from the server disk image 225 to the server COW disk image 305, in step 530, where the changes are implemented on the server disk image 225. Subsequently, the image update process 125 may return to the monitoring state of step 505.

Otherwise, if the changes are being implemented on the server snapshot fork 235, the image update process 125 maybe configured to copy the affected blocks from the server disk image 225 to the server COW disk image 305 and implement the change on the blocks on the server COW disk image 305, in step 530. Subsequently, the image update process 125 may return to the monitoring state of step 505.

Figure 6:
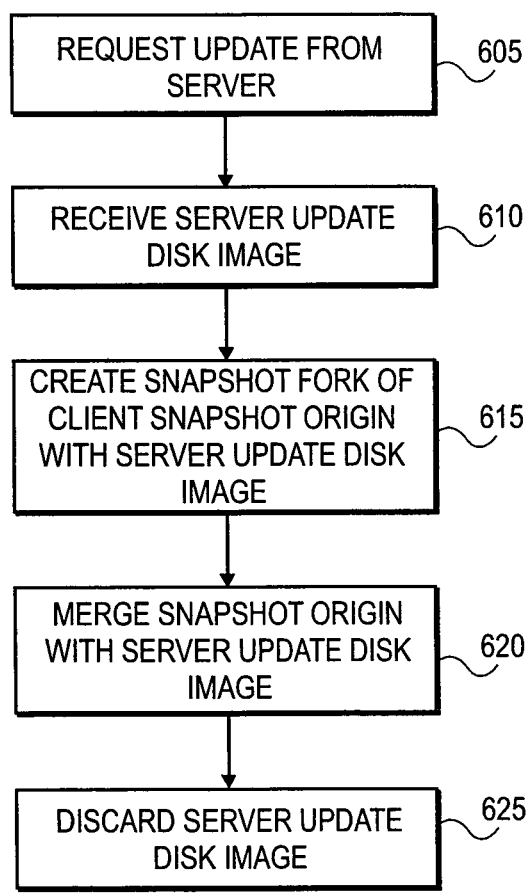
FIG. 6 illustrates another exemplary flow diagram in accordance with another embodiment.

FIG. 6 illustrates an exemplary flow diagram 600 implemented by the client image update process 125' in accordance with another embodiment. It should be readily obvious to one of ordinary skill in the art that existing steps may be modified and/or deleted and other steps added in FIG. 5.

As shown in FIG. 6, the client image update process 125' may be configured to request an update from the server 105, in step 605. More specifically, a user may have invoked the client image update process 125' to begin an update process. In other embodiments, the client image update process 125' may be daemon that executes on at a user-defined periodicity such as a week, a month or every six months as mere examples.

In step 610, the client image update process 125' may be configured to receive the update from the user in the form of the server COW disk image 305. In step 615, the client image update process 125' may be configured to create a second snapshot 435 based on the client snapshot origin fork 420 and the received server COW disk image 305. Since the received server COW disk image 305 contains all the changes between the client copy of the software and the server copy of the software and the client snapshot origin fork 420 contains the current copy of the client software, the second snapshot 435 may contain the server copy of the software as an amalgamation of the received server COW image 305 and the client snapshot origin fork 420, i.e., the latest version of the software.

In step 620, the client image update process 125' may be configured to merge the second snapshot 435, which contains the current version of the server software, with the client snapshot origin 420. More specifically, the client image update process 125' may be configured to copy the modified chunks from the server COW disk image 305 to the client snapshot origin 420. For changes to the snapshot origin fork 420, chunks affected by the change are copied from the client disk image 415 to the client COW disk image 430 and the change is made to the chunk in the client disk image 415.

In step 625, since the second snapshot 435 and the client snapshot origin fork 420 are identical after the merger, the client image update process 125' may be configured to discard the second snapshot 435. Subsequently, the client image update process 125' may return to an idle state or exit to be be invoked at a later time.

Accordingly, the client disk image 415 has been updated to the current version of the software on the server. Subsequently, when client 110 boots, the LVM 215' of the client 110 may create the snapshots and COW disk image based on the newly updated disk image.

Figure 7:
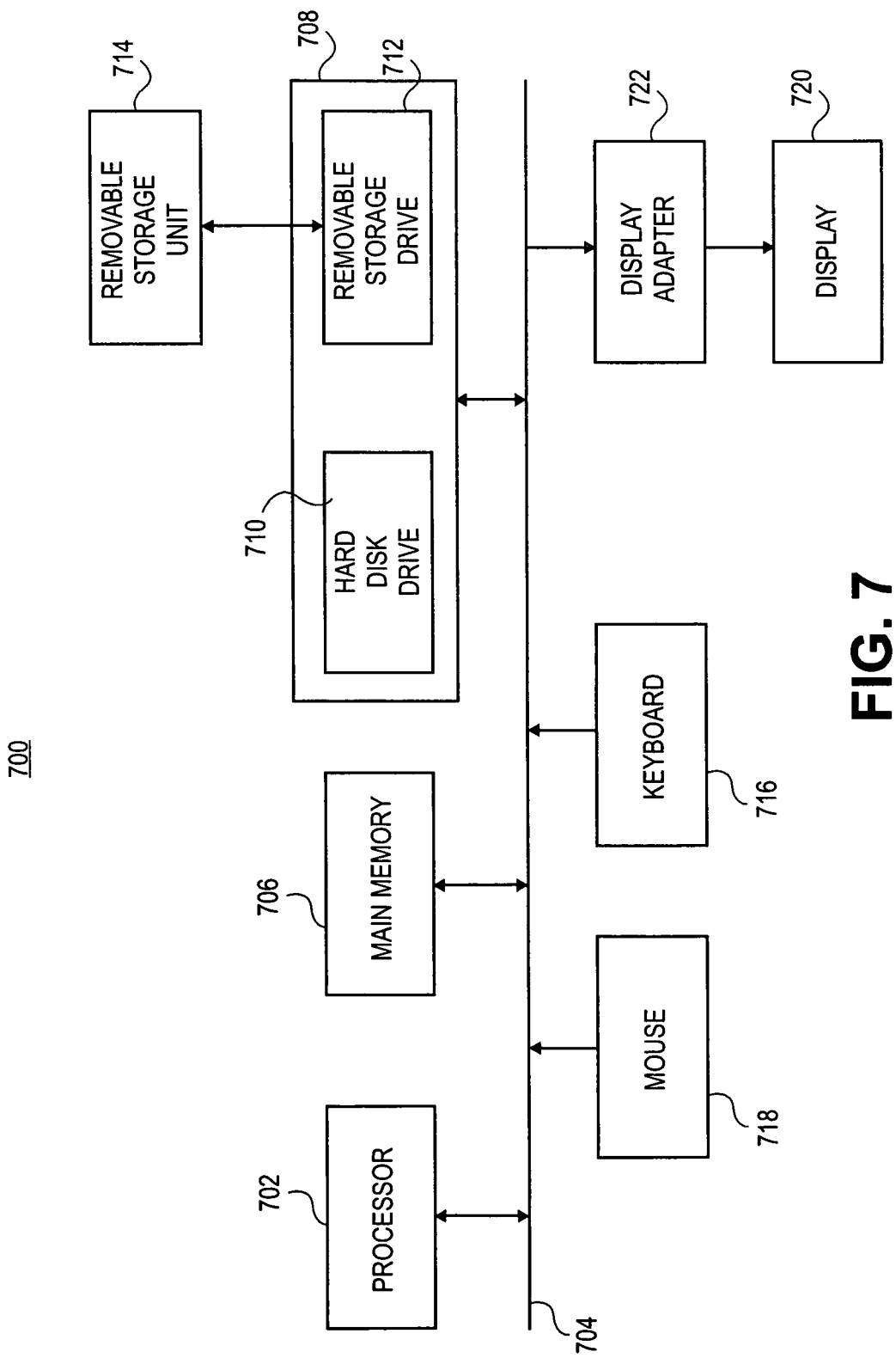
FIG. 7 illustrates an exemplary computing platform configured to execute the flow diagrams shown in FIGS. 5-6.

FIG. 7 illustrates an exemplary block diagram of a computing platform 700 where an embodiment may be practiced. The functions of the image update and client image update processes may be implemented in program code and executed by the computing platform 700. The error reporting application may be implemented in computer languages such as PASCAL, C, C++, JAVA, etc.

As shown in FIG. 7, the computer system 700 includes one or more processors, such as processor 702 that provide an execution platform for embodiments of the image update and client image update processes. Commands and data from the processor 702 are communicated over a communication bus 704. The computer system 700 also includes a main memory 706, such as a Random Access Memory (RAM), where the image update and client image update processes may be executed during runtime, and a secondary memory 708. The secondary memory 708 includes, for example, a hard disk drive 710 and/or a removable storage drive 712, representing a floppy diskette drive, a magnetic tape drive, a compact disk drive, etc., where a copy of a computer program embodiment for the image update and client image update processes may be stored. The removable storage drive 712 reads from and/or writes to a removable storage unit 714 in a well-known manner. A user interfaces with the error reporting application with a keyboard 716, a mouse 718, and a display 720. A display adapter 722 interfaces with the communication bus 704 and the display 720 and receives display data from the processor 702 and converts the display data into display commands for the display 720.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   creating an origin disk image based on a server disk image;
   creating a snapshot disk image based on the server disk image;
   generating, by a processor in response to detecting a change via at least one of the origin disk image or the snapshot disk image, an instruction to change a block of the server disk image;
   copying the block to a copy-on-write disk image prior to changing the block according to the instruction;
   determining whether the instruction was generated via at least one of the origin disk image or the snapshot disk image;
   in response to the instruction being generated via the snapshot disk image, changing, according to the instruction, the block on the copy-on-write disk image; and
   in response to the instruction being generated via the origin disk image, changing the block the server disk image according to the instruction.

2. The method of claim 1, wherein the instruction to change the block comprises an instruction to update software.

3. The method of claim 2, wherein the software comprises an operating system.

4. The method of claim 2, wherein the software comprises at least one of a word processing application or a numerical analysis application.

5. The method of claim 1, wherein the instruction to change a block of the server disk image comprises an instruction to change a driver.

6. The method of claim 1, wherein selectively changing the block as copied to the copy-on-write disk image comprises changing the block on a third disk image in view of a determination that the instruction was generated via the snapshot disk image and not changing the block as copied to the copy-on-write disk image in view of a determination that the instruction was generated via the origin disk image.

7. An apparatus comprising:
   a physical disk; and
   a processor to:
   create an origin disk image in based on a server disk image of the physical disk;
   create a snapshot disk image based on the server disk image; generate, in response to detecting a change via at least one of the origin disk image or the snapshot disk image, an instruction to change a block of the server disk image;
   copy the block to a copy-on-write disk image prior to a determination that the block of the server disk image has been changed according to the instruction;
   determine whether the instruction was generated via at least one of the origin disk image or via the snapshot disk image;
   in response to determining that the instruction was generated via the snapshot disk image, selectively change, in accordance with the instruction, the block on the copy-on-write disk image; and
   in response to determining that the instruction was generated via the origin disk image, change the block of the server disk image in accordance with the instruction.

8. The apparatus of claim 7, wherein the instruction to change a block of the server disk image comprises an instruction to update software.

9. The apparatus of claim 8, wherein the software comprises an operating system.

10. The apparatus of claim 8, wherein the software comprises at least one of a word processing application or a numerical analysis application.

11. The apparatus of claim 7, wherein the instruction to change a block of the server disk image comprises an instruction to change a driver.

12. The apparatus of claim 7, wherein to selectively change the block as copied to the copy-on-write disk image is to change the block as copied to the copy-on-write disk image in view of a determination that the instruction was generated via the snapshot disk image and not to change the block as copied to the copy-on-write disk in view of a determination that the instruction was generated via the origin disk image.

13. A non-transitory computer-readable medium having instructions encoded thereon which, when executed by a processor, cause the processor to perform operations comprising:
   creating an origin disk image based on a server disk image;
   creating a snapshot disk image based on the server disk image;
   generating, by the processor in response to detecting a change via at least one of the origin disk image or the snapshot disk image, an instruction to change a block of the server disk image;
   copying the block to a copy-on-write disk image prior to changing the block of the server disk image according to the instruction;

determining whether the instruction was generated via the origin disk image or the snapshot disk image;

in response to determining that the instruction was generated via the snapshot disk image, changing, according to the instruction, the block on the copy-on-write disk image; and in response to determining that the instruction was generated via the snapshot disk image, changing, the block of the server disk image according to the instruction.

14. The non-transitory computer-readable medium of claim 13, wherein the instruction to change a block of the server disk image comprises an instruction to update software.

15. The non-transitory computer-readable medium of claim 14, wherein the software comprises an operating system.

16. The non-transitory computer-readable medium of claim 14, wherein the software comprises at least one of a word processing application or a numerical analysis application.

17. The non-transitory computer-readable medium of claim 13, wherein the instruction to change a block of the server disk image comprises an instruction to change a driver.

18. The non-transitory computer-readable medium of claim 13, wherein selectively changing the block as copied to the copy-on-write disk image comprises changing the block as copied to the copy-on-write disk image in view of a determination that the instruction was generated via the snapshot disk image and not changing the block as copied to the copy-on-write disk image in view of a determination that the instruction was generated via the origin disk image.

* * * * *